(12) United States Patent
Rowden (10) Patent No.: US 10,541,536 B2
(45) Date of Patent: Jan. 21, 2020

(54) SYSTEM AND METHOD FOR MECHANICAL LOAD BALANCING USING GENERATOR DROOP FREQUENCY BASED ON MOTOR LOAD FEEDBACK (71) Applicant: Electronic Power Design, Inc., Houston, TX (US)

(72) Inventor: Justin Rowden, Houston, TX (US)

(73) Assignee: Electronic Power Design, Inc., Houston, TX (US)

( * ) Notice: Subject to any disclaimer, the term of this patent is extended or adjusted under 35 U.S.C. 154(b) by 404 days.

(21) Appl. No.: 15/489,570

(22) Filed: Apr. 17, 2017

(65) Prior Publication Data
US 2017/0338660 A1  Nov. 23, 2017

Related U.S. Application Data (60) Provisional application No. 62/323,145, filed on Apr. 15, 2016.

(51) Int. Cl.
B66C 13/18 (2006.01)
H02J 3/46 (2006.01)
H02J 3/06 (2006.01)
H02P 9/30 (2006.01)
G06G 7/63 (2006.01)

(52) U.S. Cl.
CPC ............... H02J 3/46 (2013.01); H02J 3/06 (2013.01); H02P 9/307 (2013.01); F15B 2211/6656 (2013.01); G06G 7/63 (2013.01)

(58) Field of Classification Search
CPC ...... G06G 7/63; H02J 3/06; H02J 3/46; H02P 1/54; H02P 29/60; H02P 5/747; H02P 9/307
See application file for complete search history.

(56) References Cited

U.S. PATENT DOCUMENTS

| 2008/0174177 A1* | 7/2008 | Langlois | H02J 1/08 307/9.1 |
| 2009/0224599 A1* | 9/2009 | Yue | H02J 1/10 307/9.1 |
| 2014/0008988 A1* | 1/2014 | Clarke | H02J 3/40 307/84 |

* cited by examiner

Primary Examiner — Muhammad S Islam
(74) Attorney, Agent, or Firm — G. Michael Roebuck, PC (57) ABSTRACT A system for variable speed drives using generators adjusting the motor frequency having a plurality of main generators 1, 2, 3 and 4 as the means of adjusting a plurality of AC motors frequency, a processor is provided that opens a main bus tie breaker in a power system to create two separate power systems, power source A and power source B, wherein power source a is powered by a generator 1 and a generator 2. and power source b is powered by a generator 3 and a generator 4, wherein the generators 1-4 are configured to operate on a droop curve wherein the output frequency of the generator is slightly reduced as the load increases.

11 Claims, 3 Drawing Sheets

SYSTEM AND METHOD FOR MECHANICAL LOAD BALANCING USING GENERATOR DROOP FREQUENCY BASED ON MOTOR LOAD FEEDBACK

CROSS REFERENCE TO RELATED APPLICATIONS

This patent application takes priority from U.S. provisional patent application Ser. No. 62/323,145 by Justin Rowden filed on Mar. 15, 2016 entitled Variable Speed Drives Using Generators Adjusting the Motor Frequency which is incorporated by reference herein in its entirety.

BACKGROUND OF THE INVENTION

It is common to use two motors, one primary and one back up to service a mechanical load. The second motor is used for providing extra torque or in case of failure of the first motor. The two motors typically share the mechanical load between the two motors. Each of the two motors are switched in and out to service the mechanical load depending on load requirements. When a first motor is inadequate to service a mechanical load a second motor is switched into provide additional torque to service the load. There is a need to balance the loads between the first and second motors when servicing a mechanical load.

FIELD OF THE INVENTION

The present invention relates to using motor load feedback to provide mechanical load balancing on motors connected to a shared load and powered by separate generators.

SUMMARY OF THE INVENTION

A system of power generators is disclosed that adjusts a frequency of alternating current supplied to (AC) motors is disclosed. In a particular illustrative embodiment, the system includes but is not limited to 4 alternating current (AC) power generators 1, 2, 3 and 4 selectively divided into two power sources A and B, that a system processor individually controls to individually adjust an operating frequency of power supplied from a generator and generator pair to 2 AC motors electrically connected to the generators. A system processor is provided that opens a bus tie breaker in a power system that includes but is not limited to the four AC power generators. The open bus tie breaker, which when closed connects power sources A and B, create two separate power sources, power source A and power source B. In a particular illustrative embodiment, power source A includes but is not limited to power generator 1 and power generator 2 and power source B includes but is not limited to generator 3 and generator 4, wherein the generators 1-4 are each configured to operate on a droop curve wherein the output frequency of one or two of the power sources A and B is reduced as the load on either one of two AC motors increases. In another particular embodiment power source A is a single power generator 1 and power source B is a single power generator 3.

DETAILED DESCRIPTION OF THE INVENTION

A system of power generators is disclosed that adjusts a frequency of alternating current supplied to (AC) motors is disclosed. A method is disclosed for using the system. In a particular illustrative embodiment, the system includes but is not limited to 4 alternating current (AC) power generators 1, 2, 3 and 4 selectively divided into two power sources A and B, that a system processor individually controls to individually adjust an operating frequency of power supplied from a generator and generator pair to 2 AC motors electrically connected to the generators. A system processor is provided that opens a bus tie breaker in a power system that includes but is not limited to the four AC power generators. The open bus tie breaker, which when closed connects power sources A and B, create two separate power sources, power source A and power source B. In a particular illustrative embodiment, power source A includes but is not limited to power generator 1 and power generator 2 and power source B includes but is not limited to generator 3 and generator 4, wherein the generators 1-4 are each configured to operate on a droop curve wherein the output frequency of one or two of the power sources A and B is reduced as the load on either one of two AC motors increases. In another particular embodiment power source A is a single power generator 1 and power source B is a single power generator 3.

A system and method are disclosed for balancing a mechanical load between two AC motors, wherein the mechanical load is shared by two alternating current (AC) electric motors driving a shared mechanical load. A bus tie electrically connects two generators supplying AC power to the two AC motors. A processor controls a bus tie that connects two pair of generators. In an illustrative embodiment, the systems runs with the bus tie open between the two pair of generators and implements a frequency droop of each pair of generators based on load feedback from each one of the two AC motors. Droop curves operation is well known in the art. Any known droop curve operation is suitable for use in the present invention. In a particular illustrative embodiment, the system runs with the bus tie open and processor implements frequency droop of the generators based on load feedback from each motor. The system provides power monitoring of the motors by monitoring motor power, motor operating state and motor load conditions at the motor feeders in an electrical connection or switchboard wherein the processor senses the motor power and the motor load conditions. In a particular illustrative embodiment, a computer program stored in computer readable medium is executed by the system processor to motor monitor motor power, motor operating state and motor load conditions at the motor feeders in an electrical connection or switchboard to perform frequency droop of each generator connected to each motor to perform load balancing. In a particular embodiment, a neural network stored in computer readable medium is executed by the system processor to motor monitor motor power, motor operating state and motor load conditions at the motor feeders in an electrical connection or switchboard to perform frequency droop of each generator connected to each motor to perform load balancing. The neural network monitors motor power, motor operating state and motor load conditions at the motor feeders in an electrical connection or switchboard and learns optimal frequency droop parameters for performing frequency droop of each generator connected to each motor to perform load balancing. The neural network then performs performing frequency droop of each generator connected to each motor to perform load balancing.

In a particular illustrative embodiment, when both AC motors are started at the same time, there will be a self-balancing effect due to substantially equal temperatures of both motor and the system runs with the bus tie closed. When the system processor detects a load imbalance between the two motors, the system processor opens the bus tie between power source A and power source B and adjusts individually performs droop frequency based on motor load conditions to adjust the generator frequency to share load between the two motors.

In another embodiment power source A is a single generator and Power source B is a single generator. Power and load monitoring of the AC motors is provided by motor feeders and sensors having an electrical connection to an electrical connection point in the system such as a switchboard that is electrically connected to a processor. When the two AC motors are operating to drive a shared mechanical load are started at the same time, there is a self-balancing effect due to substantially equal temperatures in each of the two AC motors. In this case, when the two AC motor temperatures are substantially equal when both have been powered off, cooled down and started at the same time, the system processor runs the two AC motors with the bus tie closed and the two power sources A and B are electrically connected to each other running at the same frequency. When the system detects load imbalance between the two AC motors, where a first motor is taking on a greater load than a second motor servicing the same shared load, the processor in the system opens the bus tie connecting the two power sources and individual perform droop frequency on each generator in each power source to substantially balance the shared load between the two AC motors.

In another particular illustrative embodiment of the invention, high slip AC motors are provided as AC motors 1 and 2. The high slip AC motors are made of high loss materials for a motor cage. The high slip motors are used to help provide a wider design range of slip. A family of slip curves for each AC motor is stored in the computer readable medium provided. The family of slip curves ranges from low slip to high slip for the speed/torque of the two AC motors. When the AC motors work at a temperature differential, that is, operating at different temperatures, the two motors are loaded differently due to a differential in operating temperature while sharing the same mechanical load. The temperature differential between the two AC motors creates an unequal load sharing condition between the two AC motors. There are times when the processor in the system runs a single AC motor to service the mechanical load. This single AC motor reaches full operating temperature or steady state operating temperature, while a second AC motor is offline and on standby and is thus at a lower temperature for example, 10 deg. C. The extreme temperature differential between the two AC motors can cause load sharing problems so that a second motor takes on more load than the first motor and can result in overloading the second motor.

When the mechanical load demand on a single motor (a first motor) is increased such as when a boat owner wants to speedily take the boat to go to shore, the processor places a second AC motor online to provide extra power to the propeller for speedier boat travel. Both AC motors are online servicing the shared mechanical load which has increased so that both AC motors are desired. The system processor balances the load between the two AC motors using motor load conditions to perform frequency droop of a generator in a power source to perform load balancing, when servicing the mechanical load of the two AC motors with this extreme temperature differential. In a particular illustrative embodiment of the invention, a typical marine motor to be used in tandem as the two AC motors can be 800/800 horse power, 600/600 horse power or 800/480 horse power all rated at 1800 rpm with ABS certification. In a particular illustrative embodiment, the system is used to retrofit a 480V/60 Hz vessel. In a particular illustrative embodiment of the present invention performs load balancing between two AC motor when the two AC motors are rated at different horse power, for example HP motors (800/400 HP). In another embodiment two 600 HP or 800 HP AC motors are provided.

Figure 1:
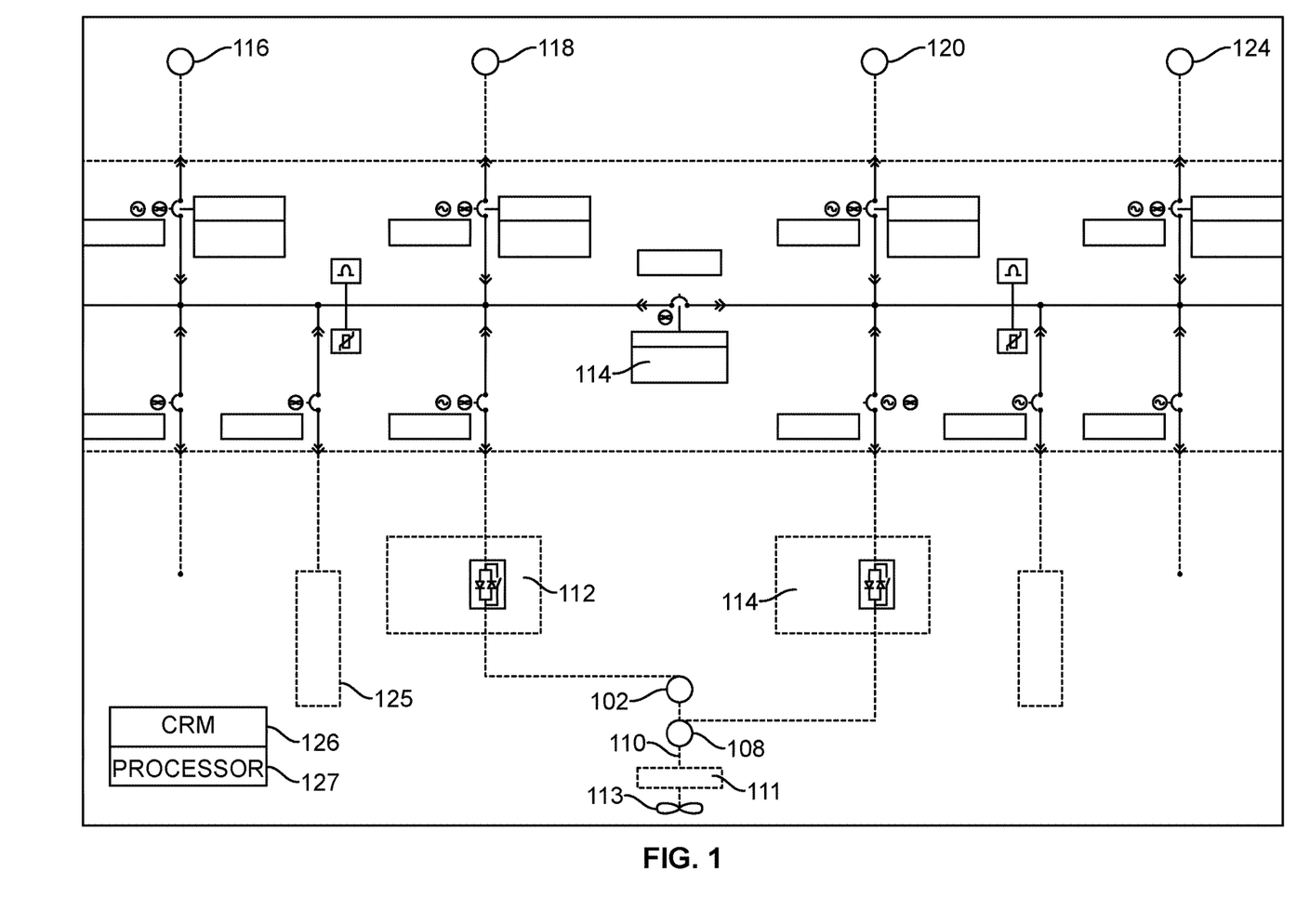
FIG. 1 depicts a schematic illustration of an illustrative embodiment of the invention showing an illustrative embodiment one-line drawing for use on a fishing vessel.

Turning now to FIG. 1, in a particular illustrative embodiment of the invention, the system includes but is not limited to 4 AC power generators, power generator 1 116, power generator 2 118, power generator 3 120 and power generator 4 124 that provide AC power to 2 AC motors 102 and 108 at a particular operating current frequency. A processor 127 is provided that selectively opens a bus tie breaker 114 provided in the system. When the processor selectively opens the bus tie when a motor load imbalance is detected, the 4 AC power generators 116, 118, 120 and 124 are electrically isolated into two pairs of generators that are disconnected from each other to create two separate power sources, a Power source A including but not limited connected generator pair 116 and 118 and a power source B including but not limited to connected generator pair 120 and 124. The bus tie disconnects and electrically isolates power source A from power source B. Power source A contains power generator 1 and power generator 2. Power source B contains generator 3 and generator 4. The generators 1-4 116, 118, 120 and 124 are configured to operate on a droop curve wherein the output frequency of the generators is slightly reduced by 1-5 percent of operating frequency as a mechanical load on either one of the two AC motors changes, increases. The droop curve is stored in a computer readable medium and used by the processor to control each of the generators 1-4 individually to perform droop frequency on a droop curve wherein the output frequency of one of the power sources A and B is reduced by 1-5 percent of operating frequency as a mechanical load on one of AC motors connected to power source A or B increases above a desired value, such as 10 percent above power overload condition for one of the AC motors. A method for using the system is also disclosed herein.

The present example of the invention described herein in one illustrative embodiment of the invention, pertains to a system as shown in FIG. 1. Turning now to FIG. 1 depicts a schematic illustration of an illustrative embodiment of the invention, accordance with a system of the present invention suitable for deployment on a fishing vessel to drive a propeller shaft. In another particular illustrative embodiment of the invention, the system is expanded to other similar embodiments and applications. In a particular illustrative embodiment, the system provides two or more alternating current (AC) motors 102 and 108 mechanically coupled to the same mechanical load 110. In a particular embodiment, the mechanical load is a drive shaft mechanically coupled to a propeller drive shaft 110 on a boat and gear box 111 to rotate a propeller 113 on a boat (not shown). In the present example of an illustrative embodiment of the invention, as shown in FIG. 1, two AC induction motors (also referred to herein as AC motors) are mechanically coupled to a single mechanical load, a propeller drive shaft. The two AC motors act together to rotate the propeller drive shaft which rotates a propeller thereby providing thrust of the boat through the water to drive a boat or other water borne vessel forward and backward in a body of water in which the vessel is deployed. In a particular illustrative embodiment of the invention, the AC motors are mechanically coupled to a gear box 111 that mechanically couples the AC motors to the propeller shaft. In another embodiment the AC motors are directly connected to the propeller drive shaft. In a particular illustrative embodiment, the propeller is a variable pitch propeller that runs continuously runs at full speed. Propeller thrust is varied by changing the pitch of propeller blades that are pitch variable and are controlled by the processor 127. The processor executes a computer program stored in a computer readable medium 126. The processor executes the computer program to control the system, which in this instance adjusts a pitch of the propeller blades to control thrust provided by the propeller. The propeller drive shaft is rotated by the two AC motors to cause the propeller to run at full speed continuously. The processor in the system individually controls two the power sources A and B that provide AC current at a particular frequency to the two AC motors that are connected the two AC motors directly across the power supply line that connects the two AC motors to the generators. Power source A is connected to a first AC motor 102 using a first power line 121 and power source B is connected to a second AC motor using a second power line 122. In the present example of an illustrative embodiment of the invention, there are no variable speed drives provided to control the two AC motors. There is no direct control of a variable speed/frequency drive to ensure that each motor shares the propeller load equally. Variable speed drives are avoided to reduce the cost that would be required to add a variable/frequency drive to the system for load balancing.

In a particular illustrative embodiment, each of the two AC motors is provided with a soft starter 112 and 114 to limit an AC motor starting current on the first AC motor and the second AC motor respectively. The processor selectively places a soft starter in line with each AC motor when the AC motor is placed on line to service the shared mechanical load. Once one of the AC motors achieves its rated speed, the soft starter for the AC motor, the processor removes the soft start by selecting a bypass contactor provided by the system that connects the AC motor directly to the one of the power sources A and B and removes the soft starter from the AC motor current. The present invention is an improvement over buying and installing software to vary the voltage that can cause Power Factor (PF) and VAR Sharing problems in the system and the soft start running continuously.

When the vessel does not require full thrust, the processor in the system services the mechanical load and rotates the propeller drive shaft with only a first AC motor. When the vessel requires additional thrust, the processor in the system determines that the mechanical load represented by the processor, requires additional propeller thrust, the processor in the system powers up a second AC motor to help service the mechanical load with both the first AC motor and the second AC motor. A load balancing problem is presented for solution by the system because the first AC motor has already been running and is warmed up to steady state operating temperature when the second motor is started and placed in service to help service the mechanical propeller shaft load. The first AC motor heats up as operation of the first AC motor has generated thermal energy during operation driving the propeller shaft and thus has heated up the first AC motor that is already running to service the mechanical load represented by the propeller shaft, to which the AC motors are connected to rotate the propeller shaft. The second AC motor that is added to rotate the propeller shaft, for additional thrust or for any other another reason, such as reducing the load on the first AC motor. The second AC motor has typically been powered off and has cooled down and thus will be start operating to rotate the mechanical load at a lower temperature. The second AC motor is at a powered up cold start temperature, that is cooler than the steady state operating temperature for the first AC motor that has already been running and has already been connected to the mechanical load. The temperature of the AC motors affects the internal resistance of the AC motors and increases slip in the AC motors as the AC motors temperatures increase during operation from a cool starting temperature. An AC motor that has been running typically reaches a steady state operating temperature that is higher than a starting temperature for the same AC motor that had been powered off. In the present example of an illustrative embodiment of the present invention, the first AC motor has been running thus the first AC motor's temperature is equal to the first AC motor's steady state operating temperature, which is higher than a powered off cold start temperature for the first AC motor. The starting temperature for the first and second AC motors is the cold start temperature the AC motor after being power off and discharging any residual heat generated by the AC motor during operation. Likewise, the temperature of the second AC motor is at a powered off cold start temperature for the second AC motor which is lower than the steady state temperature for the first AC motor and the steady temperature for the second AC motor.

Figure 2:
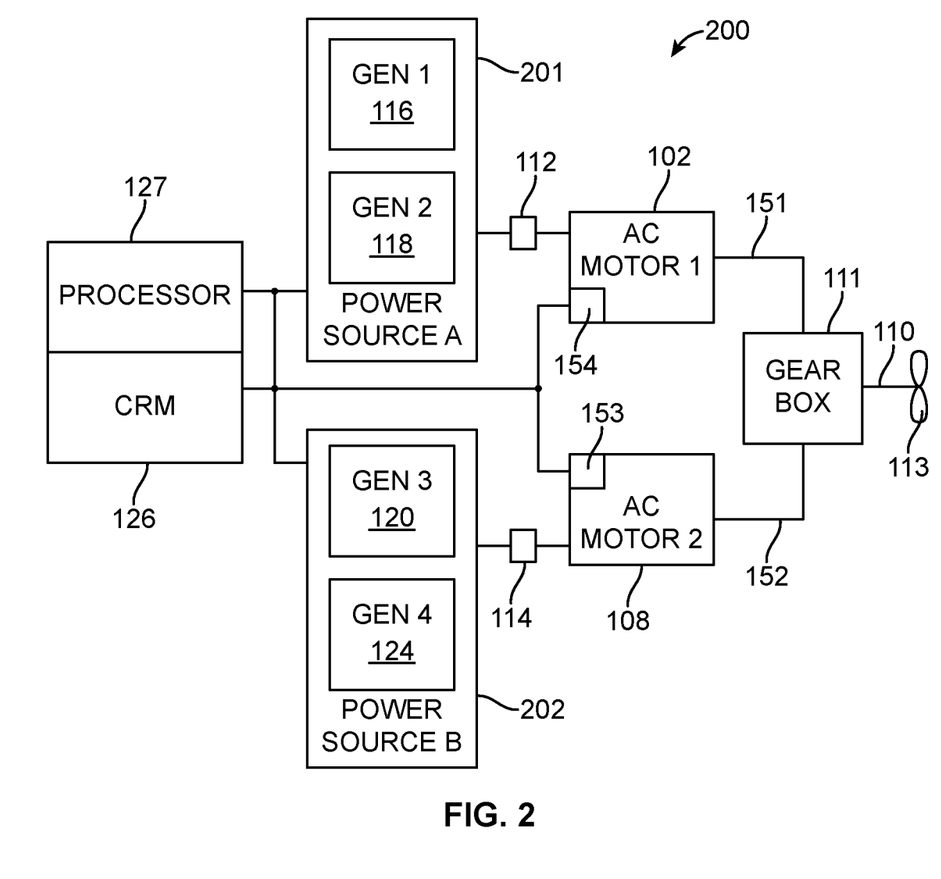
FIG. 2 depicts a schematic block diagram of an illustrative embodiment of the invention in a system for use on a fishing vessel.

Turning now to FIG. 2, a schematic block diagram of an illustrative embodiment of the system is depicted. As shown in FIG. 2, power source A 201 and power source B 202 are formed as separate power sources isolated from each other when the processor switches open bus tie 114. AC motor 102 is mechanically coupled through mechanical coupling 151 to the mechanical load 110 through gear box 111. AC motor 108 is mechanically coupled through mechanical coupling 152 to the mechanical load 110 through gear box 111. The processor 127 reads the mechanical load, including but not limited to motor power and motor load conditions on AC motor 102 though motor sensor 154. The processor 127 reads the mechanical load including but not limited to motor power and motor load conditions on AC motor 108 though motor sensor 153. When first AC motor 102 is initially started to service the load 110, the processor switches soft start 112 into power line 113 the supplies power from power source A 201. When first AC motor 102 reaches operating speed the processor switches the soft start 112 out of the power line 113 so that the AC motor 102 is directly connected to the power source A and soft start 112 is removed from the circuit, line 113 supplying power to first AC motor 102.

When second AC motor 108 is started to service the load 110, the processor switches soft start 114 into power line 115 the supplies power from power source B 202. When second AC motor 108 reaches operating speed the processor switches the soft start 114 out of the power line 115 so that the AC motor 108 is directly connected to the power source B and soft start 114 is removed from the circuit, line 115 supplying power to second AC motor 108.

Figure 3:
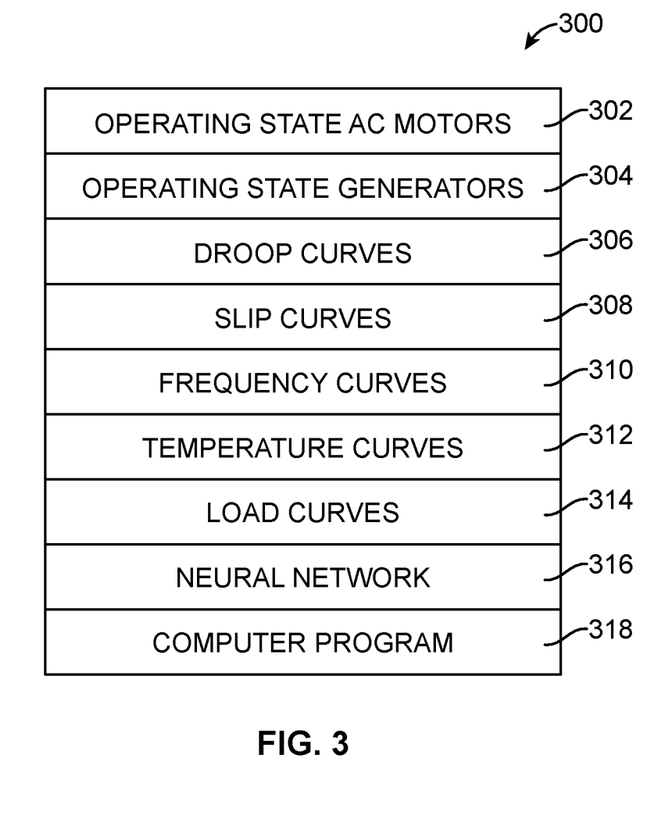
FIG. 3 depicts a data structure stored in a computer readable medium having data fields containing data that is accessed by a processor in performing monitoring of a motor load for feedback to control mechanical load sharing between 2 motors.

Turning now to FIG. 3, a data structure 300 is schematically depicted. The data structure includes but is not limited to a plurality of data fields logically that are logically organized in the computer readable medium and contain data that is accessed and used by the processor to perform load balancing using AC motor load feedback to generators to perform droop frequency and load balancing based on motor load conditions feedback. Motor load conditions includes but is not limited to the motor power and motor operating state for each of the AC motors. As shown in FIG. 3, the data structure includes but is not limited to an operating state field 302 for AC motors. The operating state field contains data indicating the operating state of AC motor 102 and an AC motor 108. Each of the operating states of the first and second AC motors are monitored, sensed and stored in the operating state field 302 for each AC motor. The processor reads the operating state of an AC motor and uses the motor load condition for a particular AC motor in load balancing a mechanical load shared by each of the two AC motors 102 and 108. For example, when a single first motor is running to service the shared mechanical load, the processor reads that the first AC motor 102 is running at a steady state temperature and that the second AC motor 108 is not running and is powered off and is at a power off cold start temperature. The processor the switches in the soft start 114 for second AC motor 108 until the second motor is up to operating speed and then removes the soft start for the second motor and directly connect the second motor to power source B. When the processor detects a load imbalance between two motors servicing a mechanical load, the processor opens the bus tie 114 to electrically isolate power source A from power source B and performs load balancing between the first AC motor 102 and the second AC motor 108 to compensate for the temperature differential between the first AC motor 102 and the second AC motor 108. The processor receives feedback from the first AC motor from motor sensor 154, indicating the load on the first AC motor 102. The processor receives feedback from the second AC motor from motor sensor 153, indicating the load on the second AC motor 108. When the second motor 108 is initially started and after the soft start has been removed, the second is at the cold start operating temperature and assumes more of the shared load 110 than the first motor 102 which has been running and is at steady state operating temperature incurring more slip and thus carrying less load the cooler second motor that is incurring less slip. The processor increases the frequency of generator power supplied to the first motor to increase torque of the first motor to assume more load to balance the load between the first and second AC motors, thereby substantially reducing the imbalance between the load on the first and second AC motors and the potential of overloading the second motor that had been taking more load than the first motor.

In a particular illustrative embodiment, the motor load conditions are used by the processor computer program along an operating state for each of the AC motors, and the droop curves, slip curves, frequency curves, temperature curves, load curves to perform load balancing. In a particular illustrative embodiment, the operating state and motor load conditions for the AC motors are used by the processor computer program is a neural network along and motor load conditions and operating state for each of the generators, and the droop curves, slip curves, frequency curves, temperature curves, load curves to perform load balances. The motor characteristics change based on the motor load conditions and operating states so thus, the motor load conditions including but not limited to the operating state for each of the generators, and the droop curves, slip curves, frequency curves, temperature curves, load curves to perform load balances based on a current operating state one of the AC motors on which droop frequency load balancing is being performed. Thus, the combination of motor load conditions is used in performing load balancing. The processor monitors an AC motor load condition via a sensor on the AC motor. In another particular embodiment, the motor load conditions for the first AC motor and the second AC motor are learned for various motor load conditions for the first AC motor and the second AC motor and are then applied to perform load balancing between the first and second AC motors.

The operating state generators field 304 holds data used by the processor for representing an operating state for each of the generators. The operating state for the generating includes but is not limited to an operating frequency for the generator. When the first AC motor is slipping and incurring less load, the processor increase the frequency of the current supplied to the first motor so that the first motor increases torque and assumes more of the load.

Droop curves are stored in data structure field 306. The droop curves are used by the processor to perform droop frequency control of the generator based on feedback of the motor load conditions to the processor. Slip curves are stored in data structure field 308. The slip curves are used by the processor to perform droop frequency control of the generator based on feedback of the motor load conditions to the processor. Motor frequency curves are stored in data structure field 310. The motor frequency curves are used by the processor to perform droop frequency control of the generator based on feedback of the motor load conditions to the processor. Motor temperature curves are stored in data structure field 312. The motor temperature curves are used by the processor to perform droop frequency control of the generator based on feedback of the motor load conditions to the processor. Motor load curves are stored in data structure field 314. The motor load curves are used by the processor to perform droop frequency control of the generator based on feedback of the motor load conditions to the processor.

A neural network is stored in data structure field 316 and is used by the processor to perform load balancing a particular illustrative embodiment. A computer program is stored in data structure field 318 and is used by the processor to perform load balancing a particular illustrative embodiment.

In another illustrative embodiment of the invention, droop curves are provided for frequency control of AC current provided to the two AC motors for starting temperature including but not limited to cold start, steady and overheating. A neural network is provided to learn optimal frequency curves for mechanical load sharing and impulse control for torque, load, propeller pitch and motor overheating, over torqueing and pre-failure recovery for the motor. Intermittent frequency, current and torque curves for operating two motors together.

The resulting effect of this thermal difference in starting and steady state operating temperature of the first and second AC motors is that the cooler second AC motor slips less than the hotter first AC motor and thus the second cooler AC motor takes on more load than the first hot motor. The first AC motor provides less torque to the mechanical load for a given power input because the first AC motor incurs greater slip due the higher temperature of the first AC motor that had been running and has achieved a steady state temperature. The second AC motor is initially cooler on startup and can run into an overload condition until the second AC motor reaches a higher operating temperature and operates with additional slip and less torque, which balances the load of driving the propeller shaft with the already operating hot first AC motor operating at steady state temperature.

This imbalance of the mechanical load represent by the propeller drive shaft that is being shared between the first and second AC motors can cause a feeder breaker to the second AC motor to trip due to overload. Overload of the breaker to the second AC motor can be caused by the second AC motor having to make up torque on the propeller shaft this not being supplied by the first AC motor due to the first AC motor slipping at steady state temperature. The AC motors each have operating states including but not limited to powered off, cold starting from a powered off state, warm starting at a temperature greater than the cold start temperature, steady state operating at state temperature, reduced torque capacity, high temperature above steady state operating temperature and high current above steady state operating current. The slipping that occurs in the first AC motor can causes other overload related problems. Overload problems can also occur when one of the two AC motor fails or is operating at an operating state of reduced output torque. To avoid the overload problems between the two AC motors operating at different temperatures or different operating states and associated slip, a variable speed drive could be added to the system to feed one or both motors. The variable speed drives are configured to load share under a master-follower configuration or a similar configuration. This variable speed drive configuration can add considerable cost. Thus, a more cost-efficient solution than a variable speed drive solution to the overload problem is provided without using variable speed drives. Instead, in a particular illustrative embodiment, variable frequency generators are provided to power two AC motors to provide controlled mechanical load sharing between the two AC motors.

In an illustrative embodiment, this overload startup problem is substantially reduce without using variable speed drives. Instead of variable speed drive, two variable frequency generators are provided to adjust the AC motor frequency. In an illustrative embodiment of the invention, this is accomplished using the main generators to adjust the each of the two AC motors frequency. A system processor is provided that opens a main bus tie breaker in power system to create two separate power systems, a power source A and power source B. Power source A is powered by generator 1 and generator 2. Power source B is powered by generator 3 and generator 4. The generators 1-4 are configured to operate on a droop curve wherein the output frequency of the generator is reduced as the load increases on the motor attached to the generator. Each one of the AC induction motors is connected directly to a power source A or B, thus the AC motor runs at the same frequency as the power source to which it is connected. Therefore, a frequency reduction or droop in a generator frequency also reduces frequency of AC power supplied to the connected AC motor and thus reduces the connected AC motor's operating frequency. The two AC motors rotate at the same speed since they are mechanically coupled on the same propeller drive shaft. By reducing the motor frequency of a first one of the AC motors, the system and method of the present invention reduces the slip of the first AC motor, thereby reducing the torque supplied from the first AC motor to the propeller shaft and thus reduces a load from the propeller shaft on the first AC motor. The result of reducing the frequency of the power supplied from power source A to the first AC motor is that the propeller load reduced on the first AC motor is transferred to the second AC motor. The processor adjusts the generators in power source B that powers the second AC motor to run at a slightly higher frequency than the first AC motor, that has been running and is at a higher steady state operating temperature with higher slip than second AC motor that is power on and starting from a cold start. Thus, the second AC motor runs a higher operating frequency, with higher torque and assumes a higher load from the propeller shaft than the first AC motor. The processor responds to this transfer of load between the first and second AC motors by adjusting the power source generator frequency, (which adjusts the motor frequency) to transfer load between the two AC motors until the load on the first and second AC motors is balanced, that is, substantially equal where the first and second AC motors are supplying a substantially equal amount of torque to the mechanical load, the propeller drive shaft. The processor is the central element of a control system that includes but not limited to sensors and controls that sense AC motor operating states, control AC motor operating states, sense generator operating states and control generator operating states. The processor and control system also compensates for mismatches in the number of parallel generators per power source by sensing and controlling actual AC motor load to define the frequency droop curve rather than sensing and control a load on the power source generators.

In another illustrative embodiment of the invention a method is provided to control the system and provide mechanical load sharing between the two AC motors.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A mechanical load balancing system, the system comprising:
   a processor;
   a computer program in a computer readable medium that is executed by the processor;
   a first alternating current (AC) generator that supplies power to a first AC motor and a second AC generator that supplies power to a second motor, wherein the processor individually adjust a frequency of one of the first and second generators, wherein the processor receives motor load conditions from each of the first and second AC motors and adjusts frequency of one of the generators, wherein the processor is configured open a bus tie breaker in a power system to create two separate power systems, power source A and power source B, when an load imbalance between the first and second motor is sensed by the processor based on the motor load conditions for the first and second AC motor, wherein power source A is powered by a generator 1 and power source B is powered by a generator 3, wherein the generators 1 and 3 are configured to operate on a droop curve wherein the output frequency of at least one of the generators is reduced as the load increases on an AC motor connected to the generator, wherein the power source A is powered by the generator 1 and a generator 2 and power source B is powered by the generator 3 and a generator 4, wherein the generators 1 and 2 and generator 3 and 4 are configured to operate on a droop curve wherein the output frequency of at least one of the power sources is reduced as the load increases on an AC motor connected to the generator,
   wherein by reducing the frequency of an AC current supplied the first generator to a first one of the AC motors, the system reduces the slip of the first AC motor, thereby reducing the torque of the first AC motor and reducing the first AC motor's load, wherein the result is that the propeller load is transferred to the second AC motor which is running at a higher frequency than the first AC motor with higher slip, higher torque, and higher load.

2. The system of claim 1, wherein the control system responds to this transfer of load by adjusting a generator frequency attached to an AC motor, which adjusts the motor frequency of one of the AC motors to transfer load until both motors are balanced.

3. The system of claim 1, wherein the motor load conditions comprise motor operating state.

4. The system of claim 1, wherein the processor uses droop curves, frequency curves, slip curves, temperature curves and load curves to perform load balancing.

5. The system of claim 2, wherein the control system compensates for mismatches in the number of parallel generators per side by using the actual AC motor load to define the frequency droop curve rather than a generator load.

6. The system of claim 4, wherein the computer program is a neural network, wherein the neural network monitors and learns motor operating states, generator operating states, droop curves, frequency curves, slip curves, temperature curves and load curves used to perform load balancing.

7. The system of claim 6, wherein the neural network, uses the learned operating states, generator operating states, droop curves, frequency curves, slip curves, temperature curves and load curves used to perform load balancing.

8. A computer readable medium containing a computer program stored in the computer readable medium for balancing a mechanical load between two motors, wherein a processor executes the computer program, the computer program comprising:
   a computer program in a computer readable medium that is executed by the processor;
   instructions to supply a first alternating current (AC) generator that supplies power to a first AC motor and a second AC generator that supplies power to a second AC motor, wherein the processor individually adjusts a frequency of one of the first and second generators, wherein the processor receives motor load conditions from each of the first and second AC motors and adjusts frequency of one of the generators;
   instructions to open a bus tie breaker in a power system to create two separate power systems, power source A and power source B, when an load imbalance between the first and second motor is sensed by the processor based on the motor load conditions for the first and second AC motor, wherein power source A is powered by a generator 1 and power source B is powered by a generator 3, wherein the generators 1 and 3 are configured to operate on a droop curve wherein the output frequency of at least one of the generators is reduced as the load increases on an AC motor connected to the generator, wherein the power source A is powered by the generator 1 and a generator 2 and power source B is powered by the generator 3 and a generator 4, wherein the generators 1 and 2 and generator 3 and 4 are configured to operate on a droop curve wherein the output frequency of at least one of the power sources is reduced as the load increases on an AC motor connected to the generator, wherein each of the AC motors are connected directly to one of the power source, wherein, a reduction in one of the generator's frequency also reduces the frequency of current supplied by the power source to a motor connected to one generator;
   the computer program further comprising:
   instructions to reduce the frequency of an AC current supplied the first generator to a first one of the AC motors, wherein the computer program reduces the slip of the first AC motor, thereby reducing the torque of the first AC motor and reducing the first AC motor's load, wherein the result is that the propeller load is transferred to the second AC motor which is running at a higher frequency than the first AC motor with higher slip, higher torque, and higher load.

9. The medium of claim 8, wherein the control system responds to this transfer of load by adjusting a generator frequency attached to an AC motor, which adjusts the motor frequency of one of the AC motors to transfer load until both motors are balanced.

10. The system of claim 9, wherein the control system compensates for mismatches in the number of parallel generators per side by using the actual AC motor load to define the frequency droop curve rather than a generator load, wherein the motor load conditions comprise motor operating state, wherein the processor uses droop curves, frequency curves, slip curves, temperature curves and load curves to perform load balancing.

11. The system of claim 9, wherein the computer program is a neural network, wherein the neural network monitors and learns motor operating states, generator operating states, droop curves, frequency curves, slip curves, temperature curves and load curves used to perform load balancing, wherein the neural network, uses the learned operating states, generator operating states, droop curves, frequency curves, slip curves, temperature curves and load curves used to perform load balancing.

* * * * *